United States Patent [19]

Kanda et al.

[11] 4,393,163
[45] Jul. 12, 1983

[54] METHOD FOR STABILIZING AN ACRYLAMIDE POLYMER IN A PETROLEUM RECOVERY PROCESS

[75] Inventors: Shoichi Kanda; Gengiro Kawamura, both of Yokohama, Japan

[73] Assignee: Nitto Chemical Industry, Co., Ltd., Tokyo, Japan

[21] Appl. No.: 101,672

[22] Filed: Dec. 10, 1979

Related U.S. Application Data

[63] Continuation-in-part of Ser. No. 970,022, Dec. 14, 1978, abandoned.

[30] Foreign Application Priority Data

Dec. 14, 1977 [JP] Japan .................................. 52-149330
Nov. 6, 1978 [JP] Japan .................................. 53-136440
Dec. 18, 1978 [SU] U.S.S.R. .............................. 2701054

[51] Int. Cl.$^3$ .............................................. C08K 5/45
[52] U.S. Cl. .................................. 524/608; 166/244 R; 524/93
[58] Field of Search ............... 260/29.6 TA, 29.6 HN, 260/29.6 Z, 29.6 MN, 29.6 MQ; 524/608, 93

[56] References Cited

U.S. PATENT DOCUMENTS

| | | | |
|---|---|---|---|
| 2,778,825 | 1/1957 | Melamed | 106/176 |
| 2,864,803 | 12/1958 | Jones | 260/45.8 NH |
| 3,235,523 | 2/1966 | Schurz | 260/45.9 NC |
| 3,255,146 | 6/1966 | Schlesmann | 260/45.8 NH |
| 3,969,329 | 7/1976 | Hirata | 526/81 X |
| 3,979,358 | 9/1976 | Nishibata | 260/45.8 NH |
| 4,080,493 | 3/1978 | Yasui | 526/192 |
| 4,204,928 | 5/1980 | Via | 260/45.8 N |
| 4,306,045 | 12/1981 | Yoshida | 526/93 |

OTHER PUBLICATIONS

Chem. Abst., 71, 13819q (1969).
Chem. Abst., 80, 28365y (1974).

*Primary Examiner*—C. A. Henderson
*Attorney, Agent, or Firm*—Sughrue, Mion, Zinn, Macpeak & Seas

[57] ABSTRACT

2-Mercaptobenzoimidazole or its water-soluble salt is added to a water-soluble acrylamide polymer containing a predominant amount of acrylamide in the molecule to inhibit degradation, especially at high temperatures, in a petroleum recovery process.

1 Claim, No Drawings

METHOD FOR STABILIZING AN ACRYLAMIDE POLYMER IN A PETROLEUM RECOVERY PROCESS

CROSS REFERENCE TO RELATED APPLICATIONS

This application is a continuation-in-part application of copending application Ser. No. 970,022, filed Dec. 14, 1978, now abandoned.

BACKGROUND OF THE INVENTION

1. Field of the Invention

This invention relates to a method for inhibiting the degradation of an acrylamide polymer and more particularly to a method of inhibiting the degradation of an aqueous solution of acrylamide polymer used in a petroleum recovery process.

2. Description of the Prior Art

Acrylamide polymers have found extensive use in many industrial fields as, for example, a sedimentation promotor, a soil conditioning agent, a paper-making chemical, an additive for electrolytic refining, an agent for reducing frictional resistance, a textile finishing agent, an oil-water separating agent, a chemical for oil recovery, and various caking agents, and new uses are developed every time there is a change or modification in the type or combination of the polymer.

The acrylamide polymers achieve the intended result in these many applications. However, because acrylamide polymers are generally more susceptible to degradation than other polymers, they frequently have not exhibited their inherent abilities to the fullest extent. For example, when an aqueous solution of an acrylamide polymer is allowed to stand at room temperature, in a relatively short period of time it often fails to retain the original viscosity. Particularly, this degradation tendency is accelerated at comparatively high temperatures, and in extreme cases, the polymer solution becomes useless for the intended application.

With this background, various investigations have been undertaken about degradation inhibitors for acrylamide polymers. For example, U.S. Pat. Nos. 3,337,356 and 3,493,539 teach that 2-(o-amido-phenyl)-2,1,3-benzotriazole or 2-(2-hydroxyphenyl)benzotriazole are effective as ultraviolet light absorbers.

When an aqueous solution of an acrylamide polymer is injected into the oil-bearing subterranean formation to recover oil, it is present in the oil-bearing subterranean formation (ranging from injection wells to production wells), which is generally at a temperature of about 40° to about 120° C., for long periods of several months to several tens of months. Accordingly, the oil recoverers demand quality assurance of the polymer during this period, and the suppliers of the acrylamide polymers are required to minimize the degradation of these polymers with time in the above temperature range. It is not until this problem is solved that the acrylamide polymers can be fully used to exhibit their inherent function.

The reduction of the quality of the acrylamide polymers under the oil recovering conditions is belived to be due to the disintegration or depolymerization of the polymers, but the mechanism has not yet been fully elucidated. It is generally thought to be based on a free radical reaction involving dissolved oxygen in water, etc. From this standpoint, U.S. Pat. No. 3,580,337 discloses the use of a water-soluble divalent metal salt such as sodium hydrosulfite as an oxygen scavenger in oil recovery, and U.S. Pat. No. 3,800,887 states that formaldehyde is effective as an oxygen scavenger.

SUMMARY OF THE INVENTION

An object of the present invention is to improve the stability of aqueous solutions of acrylamide polymers used in flooding oil-bearing formations.

Another object of this invention is to improve the stability of aqueous solutions of partially hydrolyzed polyacrylamide in a petroleum recovery process.

As a result of extensive investigations into methods for stabilizing acrylamide polymers and additives for stabilizing these polymers in a petroleum recovery process, such as recovery of petroleum from oil-bearing formations, it has been discovered that the decomposition of acrylamide polymers can be substantially prevented by incorporating 2-mercaptobenzoimidazole or its water-soluble salts into these polymers. More particularly, it has been discovered that aqueous solutions of these polymers can be stabilized for use in a petroleum recovery process by the addition of 2-mercaptobenzoimidazole or its water soluble salt.

DETAILED DESCRIPTION OF THE INVENTION

This invention relates to a method for stabilizing an aqueous solution of an acrylamide polymer for use in a petroleum recovery process which comprises adding 2-mercaptobenzoimidazole or its water-soluble salt to an aqueous solution of an acrylamide polymer.

The 2-mercaptobenzoimidazole or its water-soluble salts used in this invention to stabilize acrylamide polymers are water-soluble compounds presented by the following general formula

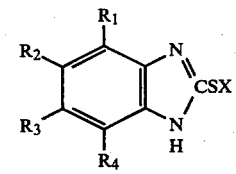

wherein $R_1$, $R_2$, $R_3$ and $R_4$ each represents a hydrogen atom or a lower alkyl group having 1 to 4 carbon atoms such as a methyl or an ethyl, and X represents a hydrogen atom, an alkali metal atom or ammonium.

Since compounds of the above formula in which X is hydrogen generally have unsatisfactory solubility, the 2-mercaptobenzoimidazoles are frequently used in the form of sodium, potassium or ammonium salts.

The acrylamide polymers to be stabilized in this invention include polyacrylamide, copolymers comprising a predominant (e.g., greater than 50%) amount of an acrylamide moiety, water-soluble copolymers of acrylamide with other vinyl monomers and mixtures thereof. A comonomer for copolymerization with acrylamide is a hydrophilic monomer such as methacrylamide, (meth)-acrylic acid (salts), (meth)acrylonitrile, 2-acrylamide-2-methylpropanesulfonic acid (salts), dimethylaminoethyl methacrylate, lower alkyl esters (e.g., methyl, ethyl, etc.) of acrylic acid, and vinylpyridine. The copolymers are not limited to those obtained by copolymerization reactions, but include those obtained, for example, by hydrolyzing not more than 50 mole % of the amide groups of polyacrylamide, or by introducing into the amide groups other functional groups by a polymer reaction such as methylolation or the Mannich reaction.

The molecular weight of the polyacrylamide polymer used in the present invention is $5 \times 10^5$ to $1.5 \times 10^7$, generally $2 \times 10^6$ to $1 \times 10^7$.

The concentration of the aqueous solution of acrylamide polymers stabilized in accordance with the invention may be about 0.0001 to about 20% by weight, preferably about 0.0001 to about 5% by weight.

The aforesaid stabilizers can be used either alone or if required, in a mixture of two or more. They can also be used in conjunction with conventionally known stabilizers. The amount of the stabilizer is desirably about 0.1 to about 20 parts by weight per 100 parts by weight of the acrylamide polymer and preferably 0.5 to about 10 parts by weight per 100 parts by weight of the acrylamide polymer. When the amount is less than about 0.1 part by weight, the stabilizing effect is small. Amounts exceeding about 20 parts by weight are economically undesirable and the effect obtained is little different from that obtained when using 20 parts by weight of the stabilizer.

Incorporation of the stabilizer into the acrylamide polymer in this invention may be performed by various methods. For example, an acrylamide polymer powder may be mixed with a powder of the stabilizer using a mixer, blender or the like, a gel-like acrylamide polymer can be mixed with the stabilizer in the form of a powder of aqueous solution, or a powder or an aqueous solution of the stabilizer can be added to an aqueous solution of the acrylamide polymer while stirring the mixture.

The stabilizing effect of the aqueous solution of acrylamide polymer stabilized by the method of this invention is exhibited even at temperatures below room temperature (for example, 0° C.) and at high temperatures on the order of 120° C., for example. In particular, the stabilizing effect at high temperature is useful.

The type of the water to be used to form the polymer solution is not particularly restricted, and may be selected from sea water, river water, city water, industrial water, and the like.

The following Examples illustrate the effect of the invention in more detail. While these examples are directed to the use of gel-like polymers, it will be understood the present invention is equally applicable to aqueous polymer solutions obtained by polymerization at low concentrations. Unless indicated otherwise, all parts in these examples are by weight.

EXAMPLE 1

Acrylamide (230 parts) and 770 parts of degassed, deionized water are admitted into a 1.5 liter Dewar bottle. The pH of the mixture was adjusted to 8, and 0.05 part of azobisamidinopropane hydrochloride and 0.05 part of nitrilo-tris-propionamide were added thereto. The polymerization was initiated at 25° C.

The resulting polymer was gel-like and elastic. The polymer was cut into small cubic pieces with one side measuring about 5 mm, dried at 60° C., and then pulverized to a size of less than about 2 mm. A portion of the powdery polymer was dissolved in degassed, deionized water to form a 0.1% solution. The solution had a viscosity of 150 centipoises (at 25° C. using Blookfield viscometer).

Separately, the dried polymer was dissolved in degassed, deionized water to form a 0.2% aqueous solution. The viscosity (initial viscosity $A_o$) of the solution was measured. Then, the aqueous solution was divided, and a sodium salt of 2-mercaptobenzimidazole (MBI-Na) was added to each portion in the amounts shown in Table 1. The mixture was heat-treated in a glass ampoule at 70° C. for 5 days, and the viscosity (A) of the solution was measured. The change in the viscosity of the solution with time, expressed as percent viscosity loss $(A_o-A)/A_o \times 100$, is shown in Table 1.

TABLE 1

| Amount MBI-Na (wt % based on the polymer) | Viscosity Loss (%) |
|---|---|
| 0 | 65.4 |
| 0.8 | 10.2 |
| 2.0 | 4.3 |
| 5.0 | 0.7 |

EXAMPLE 2

Sodium hydroxide was added to the same acrylamide polymer gel as used in Example 1, which was then kneaded to hydrolyze 15 mol % of its amide groups. The partially hydrolyzed polyacrylamide was tried in the same way as in Example 1 to form a powdery polymer.

The powdery polymer was dissolved in a 3% aqueous solution of sodium chloride to form a 1.5% aqueous solution of the polymer which was divided into four portions. Then the sodium salt of 2-mercaptobenzoimidazole was added in each of the portions in the amount indicated in Table 2. The variations of the viscosity of the solution were measured in the same way as in Example 1, and the results are shown in Table 2.

TABLE 2

| Amount MBI-Na (Wt % based on the polymer) | Viscosity Loss (%) |
|---|---|
| 0 | 34.3 |
| 0.3 | 9.1 |
| 0.8 | 2.1 |
| 2.0 | 0.3 |

EXAMPLE 3

The powder of partially hydrolyzed polyacrylamide obtained in Example 2 as dissolved in a 3% aqueous solution of sodium chloride to form a 1.5% aqueous solution of the polymer which was divided into four portions. 2-Mercapto-4-methylbenzoimidazole (methyl MBI-Na) was added to each portion in the amounts indicated in Table 3, and the variations in the viscosity of the solution were measured as in Example 1. The results are shown in Table 3.

TABLE 3

| Amount Methyl MBI-NA (Wt % based on the polymer) | Viscosity Loss (%) |
|---|---|
| 0 | 34.3 |
| 0.3 | 10.0 |
| 0.8 | 2.8 |
| 2.0 | 1.4 |

EXAMPLE 4

The sodium salt of 2-mercaptobenzoimidazole was added in the amounts indicated in Table 4 to four samples of the partially hydrolyzed polyacrylamide gel obtained in Example 2. The samples were kneaded and dried in the same way as in Example 1.

The dried polymer was dissolved in a 3% aqueous solution of sodium chloride to form a 1.5% aqueous solution of the polymer, and heat-treated at 70° C. for 5 days. The viscosity losses were measured, and the results are shown in Table 4.

TABLE 4

| Amount MBI-Na (wt % based on the polymer) | Viscosity Loss (%) |
|---|---|
| 0 | 34.3 |
| 0.3 | 10.1 |
| 0.8 | 3.0 |
| 2.0 | 0.6 |

EXAMPLE 5

Acrylamide (200 parts), 30 parts of methacrylic acid and 770 parts of degassed deionized water were admitted to a 1.5 liter Dewar bottle. The pH of the mixture was adjusted to 8, and 0.04 part of 2,2'-azobis-2-amidinopropane hydrochloride and 0.05 part of nitrilo-tris-propionamide were added. The polymerization was performed at 25° C. The resulting polymer was gel-like and elastic. The polymer was cut to small cubic pieces each side measuring about 5 mm, dried at 60° C., and then pulverized to a size of less than about 2 mm.

A part of the powdery polymer was dissolved in degassed, deionized water to form a 0.1% aqueous solution. The viscosity of the solution was found to be 100 centipoises (measured as in Example 1).

The powdery polymer was dissolved in degassed, deionized water to form a 0.5% aqueous solution of the polymer, and MBI-Na was added in the amounts indicated in Table 5. Each of the mixtures was heat-treated at 50° C. for 10 days, and the viscosity losses of the solution were measured. The results are shown in Table 5.

TABLE 5

| Amount MBI-Na (wt % based on the polymer) | Viscosity Loss (%) |
|---|---|
| 0 | 58.2 |
| 1.0 | 8.6 |
| 3.0 | 3.1 |
| 6.0 | 0.1 |

EXAMPLE 6

Example 5 was repeated except that 2-mercaptobenzoimidazole (MBI) was used instead of MBI-Na in Example 5. The results are shown in Table 6.

TABLE 6

| Amount MBI (wt % based on the polymer) | Viscosity Loss (%) |
|---|---|
| 0 | 58.2 |
| 1.0 | 8.6 |
| 3.0 | 7.4 |
| 6.0 | 6.6 |

EXAMPLE 7

The powdery polymer as used in Example 2 was dissolved in a 3% aqueous solution of sodium chloride to form a 0.1% aqueous solution of the polymer which was divided into two portions. Then the 2-mercaptobenzoimidazole (MBI) was added in each of the portions in the amount indicated in Table 7 below. The variations of the viscosity of the solution were measured in the same way as in Example 1 except that the aging temperature was 70° C., the aging period was 200 days, and the initial viscosity of the solution was 9.5 centipoises. The results are shown in Table 7 below.

TABLE 7

| Amount MBI (wt % based on the polymer) | Viscosity Loss (%) | | | |
|---|---|---|---|---|
| | 20 days | 50 days | 100 days | 200 days |
| 0 | 57.5 | 74.1 | 80.2 | 83.4 |
| 2.0 | 21.2 | 26.7 | 28.4 | 31.3 |

EXAMPLE 8

An artificial core was prepared by filling a glass cylinder (2.7 cm in diameter and 20 cm high) with river sand cleared of mud and dried. The core was placed under vacuum and saturated with 2% saline solution. A hand pump was used to pass an oil ("JS 20", the standard solution for calbration of viscometer, manufactured by Showa Oil Co., Ltd.) through the core until 200 cc of an effluent was obtained. A piston micropump was used to inject polymer solution into the oil-containing artificial core, and the amount of oil recovered in each 10 cc of the effluent for the first 50 cc portion was measured. The results are shown in Table 8 below.

TABLE 8

| Test Item | | Polymer Solution | |
|---|---|---|---|
| | | A | B |
| Core volume | (cm³) | 94.0 | 95.0 |
| Air permeability | (darcy) | 36 | 33 |
| Porosity | (%) | 39.7 | 38.1 |
| Oil Saturation | (%) | 72.4 | 71.1 |
| Oil recovered in each 10 ml of effluent | 0–10 ml | 10 | 10 |
| | 10–20 ml | 6.1 | 7.4 |
| | 20–30 ml | 1.1 | 2.4 |
| | 30–40 ml | 0.3 | 1.2 |
| | 40–50 ml | 0.2 | 0.6 |
| Total oil recovered | (cm³) | 17.7 | 21.6 |
| Percentage recovery | (%) | 65.5 | 84.4 |

A: MBI was not added and the aging period was 200 days. B: MBI was added (2 wt% based on the polymer) and the aging period was 200 days.

While the invention has been described in detail and with reference to specific embodiments thereof, it will be apparent to one skilled in the art that various changes and modifications can be made therein without departing from the spirit and scope thereof.

What we claim is:

1. An aqueous solution of an acrylamide polymer stabilized for use in a petroleum recovery process comprising a partially hydrolyzed polyacrylamide, water, and a stabilizing effective amount of 2-mercaptobenzoimidazole or a water-soluble salt thereof having the general formula

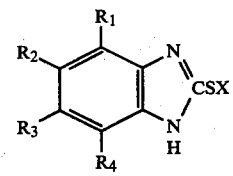

wherein $R_1$, $R_2$, $R_3$ and $R_4$ each represents a hydrogen atom or a lower alkyl group, and X represents a hydrogen atom, an alkali metal atom or an ammonium group.

* * * * *